UNITED STATES PATENT OFFICE.

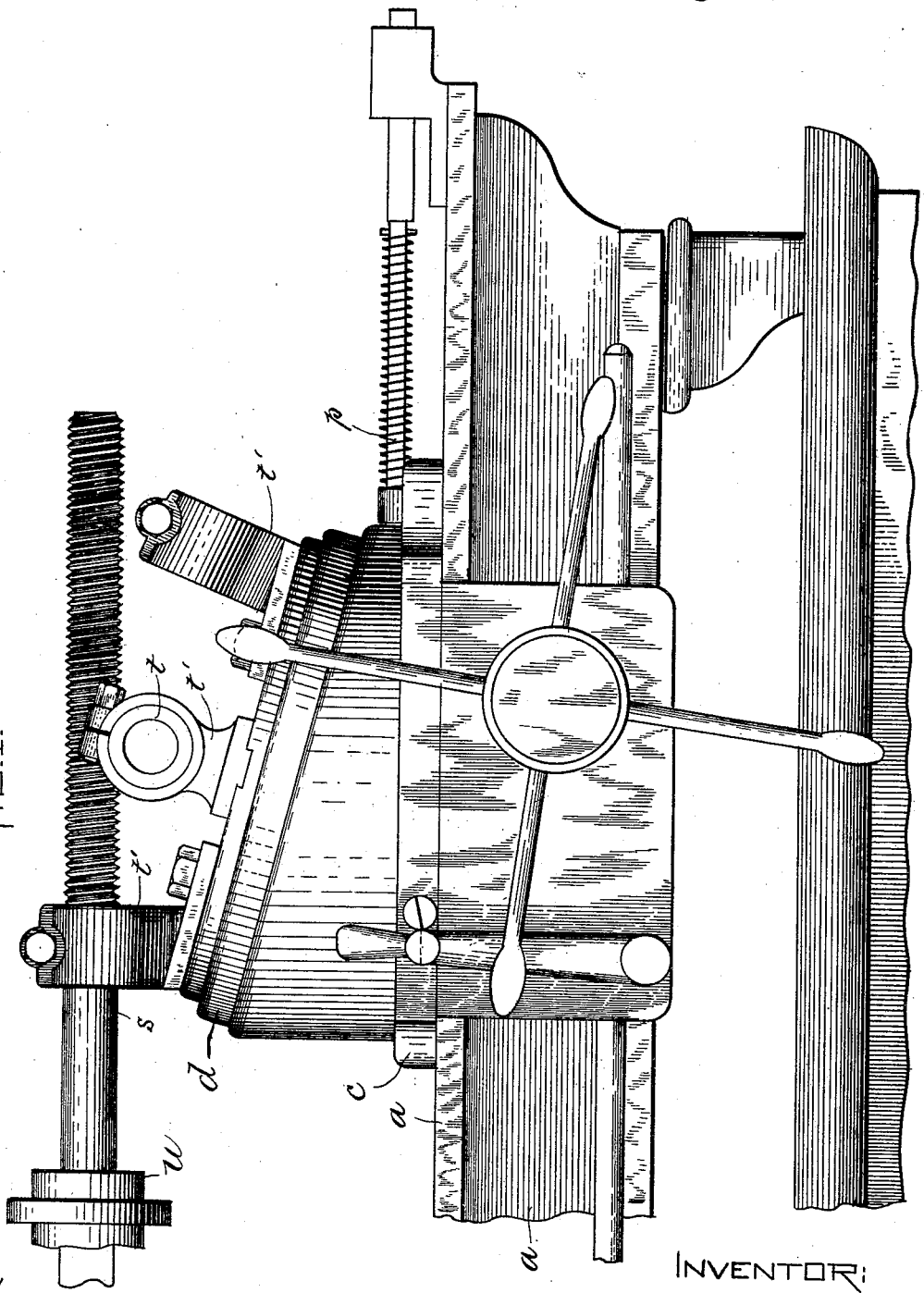

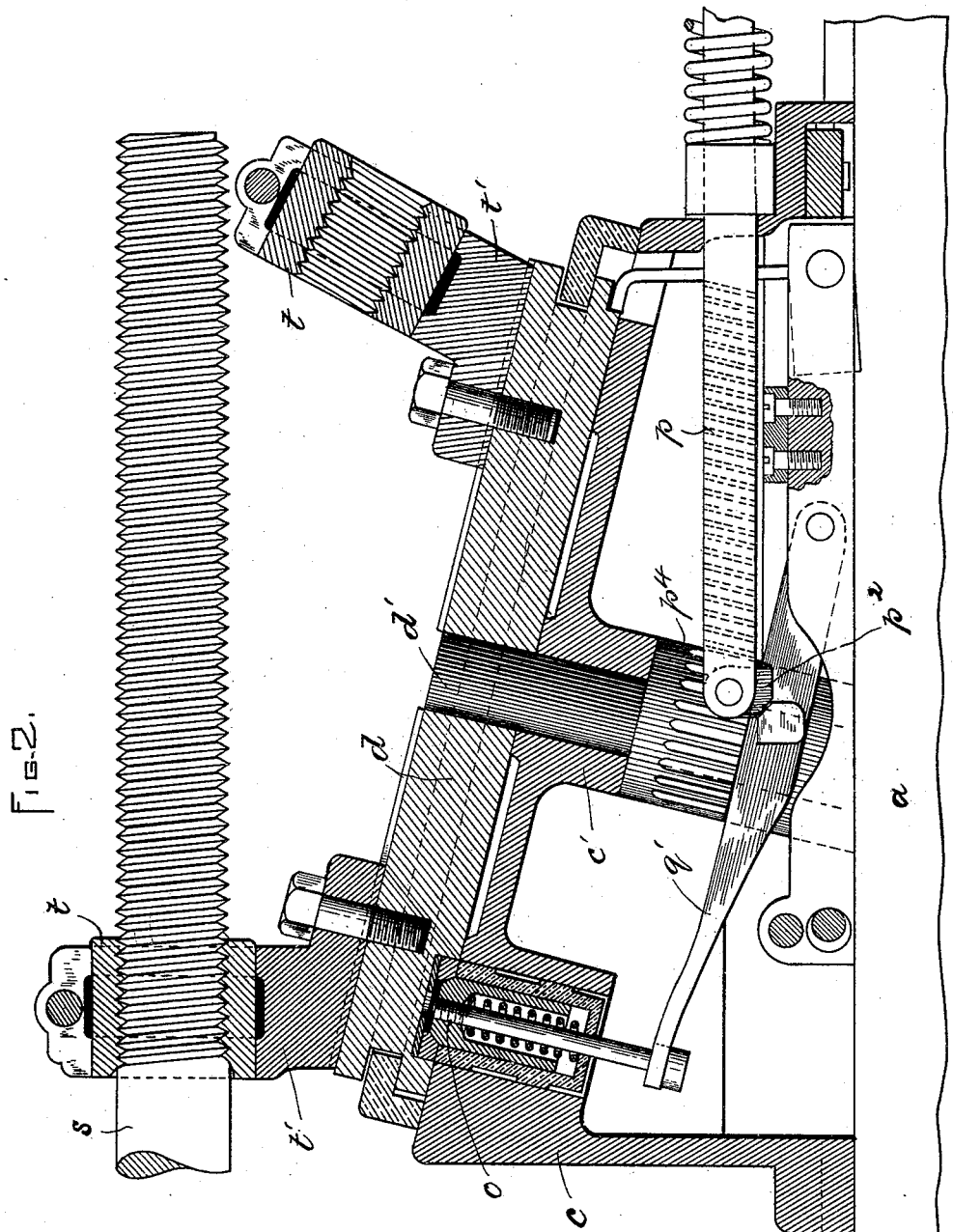

JAMES HARTNESS, OF SPRINGFIELD, VERMONT.

TURRET-LATHE.

SPECIFICATION forming part of Letters Patent No. 481,356, dated August 23, 1892.

Application filed July 20, 1891. Serial No. 400,010. (No model.)

*To all whom it may concern:*

Be it known that I, JAMES HARTNESS, of Springfield, in the county of Windsor and State of Vermont, have invented certain new and useful Improvements in Turret-Lathes, of which the following is a specification.

This invention relates to turret-lathes of the general construction shown in my application for Letters Patent of the United States filed January 7, 1891, Serial No. 377,238. In said application I have shown and claimed a turret of flat or turn-table form having a series of operating-tools upon its upper surface, said tools projecting above the body of the turret, each tool being adapted to be brought by the partial rotation of the turret into position to act on a piece of work held and rotated by the chuck on the lathe-spindle. I have heretofore mounted the turret on an axis which is perpendicular to the axis of rotation of the work, the upper surface of the turn-table being substantially horizontal. I have found that in treating long pieces of work some difficulty is caused by the contact of the outer end of the piece with a tool at the rear side of the turret, or at the side opposite the tool which is for the time being in operation.

The present invention has for its object to obviate this difficulty; and it consists in arranging the turret on an inclined axis, so that the operating-tool that faces the chuck and is in position to act upon the work will be elevated so far above the tool at the opposite edge of the turret that a piece of work, after passing through the operating-tool and projecting across the turret, will stand above the tool above the operating-tool, thus avoiding obstruction of the work by contact with said opposite tool, all of which I will now proceed to describe and claim.

In the accompanying drawings, forming a part of this specification, Figure 1 represents a side elevation of a turret and its carrier constructed in accordance with my invention and the portion of the lathe-bed. Fig. 2 represents a vertical central section of the turret and carrier.

The same letters of reference indicate the same parts in all of the figures.

In the drawings, *a* represents the bed of the lathe, which is mounted upon suitable legs or supports and is provided with suitable ways upon which the turret-carrier *c* travels lengthwise of the bed.

*d* represents the rotary turret, which is mounted upon the carrier and has a series of operating-tools, which are adapted to be brought successively into position to act upon the stock *s* held by the chuck with which the machine is provided.

*u* represents the work-holding chuck which presents the work to the operating-tool.

As my present invention relates only to the turret and its carrier, I do not show the entire machine, and I may remark that the general construction of the machine may be the same as described and shown in my application above referred to.

In carrying out my invention I support the turret *d* in an inclined position, or arrange the turret so that the operating-tool *t*, which is at the front of the turret and nearest the chuck *u*, is at the highest part of the turret, the inclination of the turret being such that the stock *s*, if extended through the operating-tool and across the turret, will be located above the tool *t* on the opposite or rear edge of the turret, so that the turret may act on the stock to any desired length without interference by the contact of the stock with the tool opposite the operating-tool. The turret may be supported in an inclined position by any suitable means. I have here shown the carrier *c* as provided with an inclined upper surface or seat for the turret and an inclined socket or bearing *c'*, which receives the shaft *d'*, affixed to the center of the turret, said shaft projecting below the bearing *c'* and being rotated by suitable appliances to give the turret the partial rotations required to bring one tool after another into the elevated position for operation.

It is obvious that the turret may be mounted on a compound or double slide, so that it may have a cross-travel in addition to its longitudinal travel.

The holders or brackets *t'*, which support the tools *t*, are arranged so that each when in its operative position will correspond with the horizontal position of the stock *s*, the opposite tool being at the same time inclined and out of line with the stock, as clearly shown in Fig. 2.

It is to be particularly noted that the turret is inclined in the direction in which the stock $s$ extends—that is, in the direction of travel and downwardly from the work-carrying head and not laterally with respect to the line of travel.

The means for rotating the turret and for locking the same when in operation and for unlocking it preparatory to its rotation, are preferably the same as in my former application.

In Fig. 2 I have shown the reciprocating rack $p$, which engages the pinion $p^4$ on the shaft of the turret, said rack being also provided with a dog $p^2$, which acts on the lever $q'$, whereby the turret-locking pin or stud $o$ is depressed prior to the partial rotation of the turret. I do not limit myself, however, to the described devices for operating the turret and may operate the same in any other suitable way. The form of the turret may also be variously modified without departing from the spirit of my invention.

I claim—

1. In a turret-lathe or screw-machine of the class hereinbefore described, the combination, with the bed, the work-holding chuck, and other essential parts, of an inclined turret having a series of operating-tools projecting above its upper surface, the inclination of the turret being such as to elevate the tool which is in operative position or nearest the chuck and depress the opposite tool, whereby the work is enabled to project across the turret from the operating-tool without contact with the opposite tool, as set forth.

2. The combination, with the bed, the work-holding chuck, and other essential parts, of a carrier having an inclined seat and an inclined bearing at its central portion, the highest part of said seat being nearest said chuck, and a turret formed to rest in an inclined position on said seat and having a shaft journaled in said bearing, said turret having operating-tools projecting above its upper surface, as set forth.

3. A lathe provided with a work-holding chuck and a tool-carrying turret inclined downward from the said chuck and provided with a series of operating-tools, the highest part of the turret being nearest the chuck, so that the operating-tool at the front of the turret is raised above the opposite tool, as set forth.

In testimony whereof I have signed my name to this specification, in the presence of two subscribing witnesses, this 10th day of July, A. D. 1891.

JAMES HARTNESS.

Witnesses:
 C. G. RICHARDSON,
 G. H. POND.